(12) United States Patent
Fribus et al.

(10) Patent No.: US 12,091,127 B2
(45) Date of Patent: Sep. 17, 2024

(54) OPERATING DEVICE, VEHICLE AND METHOD FOR OPERATING A VEHICLE

(71) Applicant: ZF Friedrichshafen AG, Friedrichshafen (DE)

(72) Inventors: Vitali Fribus, Quakenbrück (DE); Ludger Rake, Steinfeld (DE)

(73) Assignee: Signata GmbH, Diepholz (DE)

( * ) Notice: Subject to any disclaimer, the term of this patent is extended or adjusted under 35 U.S.C. 154(b) by 0 days.

(21) Appl. No.: 17/784,284

(22) PCT Filed: Dec. 7, 2020

(86) PCT No.: PCT/EP2020/084823
§ 371 (c)(1),
(2) Date: Jun. 10, 2022

(87) PCT Pub. No.: WO2021/115995
PCT Pub. Date: Jun. 17, 2021

(65) Prior Publication Data
US 2023/0040561 A1  Feb. 9, 2023

(30) Foreign Application Priority Data
Dec. 12, 2019  (DE) ............ 10 2019 219 395.1

(51) Int. Cl.
*B62K 23/02*  (2006.01)
*B60K 35/10*  (2024.01)
(Continued)

(52) U.S. Cl.
CPC ............ *B62K 23/04* (2013.01); *G05G 1/105* (2013.01); *G05G 5/03* (2013.01); *G05G 5/05* (2013.01);
(Continued)

(58) Field of Classification Search
CPC ........ B62K 23/02; B62K 23/04; G05G 1/105; G05G 5/03; G05G 5/05; G05G 2505/00;
(Continued)

(56) References Cited

U.S. PATENT DOCUMENTS 7,290,462 B2 *  11/2007  Hou ...................... B62M 25/04
                                                               74/507
10,088,915 B2 *  10/2018  Drum .................... G06F 3/0338
(Continued)

FOREIGN PATENT DOCUMENTS

DE  10 2004 041 690 A1   3/2005
DE     197 02 788 B4    8/2005
(Continued)

OTHER PUBLICATIONS

Machine translation of DE 102017210437 A1 obtained on May 1, 2023.*
(Continued)

*Primary Examiner* — Adam D Rogers
(74) *Attorney, Agent, or Firm* — Crowell & Moring LLP

(57) ABSTRACT

An operating device for a vehicle comprises an outer unit that can be rotated manually, a detection device configured to detect the movement of the outer unit and generate a control signal using a value that characterizes the movement to control a vehicle function, and an actuator unit that contains a magnetorheological medium, which can be or is coupled to the outer unit and is configured to exert a retaining force on the outer unit based on the viscosity of the magnetorheological medium. The operating device also comprises a sensor unit located in the outer unit and configured to generate a hand signal indicating the absence of a user's hand on the outer unit, and a manipulating device for manipulating the control signal on the basis of the hand signal.

20 Claims, 8 Drawing Sheets

(51) Int. Cl.
  *B62J 45/40* (2020.01)
  *B62K 23/04* (2006.01)
  *G05G 1/10* (2006.01)
  *G05G 5/03* (2008.04)
  *G05G 5/05* (2006.01)
  *B62J 45/412* (2020.01)
  *B62J 45/413* (2020.01)

(52) U.S. Cl.
  CPC ........ *B60K 35/10* (2024.01); *B60K 2360/126* (2024.01); *B62J 45/412* (2020.02); *B62J 45/413* (2020.02); *G05G 2505/00* (2013.01)

(58) Field of Classification Search
  CPC .. B60K 2370/126; B62J 45/412; B62J 45/413
  See application file for complete search history.

(56) References Cited

U.S. PATENT DOCUMENTS

| | | | |
|---|---|---|---|
| 10,572,088 B2* | 2/2020 | Alack, Jr. | G06F 3/04166 |
| 10,864,962 B2* | 12/2020 | Pankratz | B62J 45/422 |
| 11,427,279 B2* | 8/2022 | Moseley | B62J 45/42 |
| 11,519,494 B2* | 12/2022 | Petrzik | F16D 57/002 |
| 2020/0215908 A1* | 7/2020 | Petrzik | G06F 3/0383 |
| 2022/0161806 A1* | 5/2022 | Petrzik | B60W 30/18109 |

FOREIGN PATENT DOCUMENTS

| | | | | |
|---|---|---|---|---|
| DE | 10 2010 055 831 A1 | 6/2012 | | |
| DE | 10 2010 062 517 A1 | 6/2012 | | |
| DE | 100 27 193 B4 | 4/2013 | | |
| DE | 102015223341 A1 * | 6/2017 | | |
| DE | 20 2016 007 628 U1 | 4/2018 | | |
| DE | 10 2017 210 437 A1 | 12/2018 | | |
| DE | 102017210443 A1 * | 12/2018 | | |
| WO | WO 2014/029388 A1 | 2/2014 | | |
| WO | WO-2018219600 A1 * | 12/2018 | ............ | D06F 34/30 |
| WO | WO 2019/106073 A1 | 6/2019 | | |
| WO | WO-2020188046 A1 * | 9/2020 | ...... | B60W 30/18109 |

OTHER PUBLICATIONS

Machine translation of DE 102015223341 A1 obtained on May 2, 2023.*
Machine translation of WO 2018/219600 A1 obtained on May 2, 2023.*
International Search Report and Written Opinion of the International Search Authority mailed Mar. 30, 2020 in International Application No. PCT/EP2020/084823 (English and German languages) (11 pp.).
Office Action dated Sep. 17, 2020 for German Patent Application No. 10 2019 219 395.1 (10 pp.), note: pp. 1 and 2 are English language Explanations to Section C. Result of Determination Document.

* cited by examiner

OPERATING DEVICE, VEHICLE AND METHOD FOR OPERATING A VEHICLE

CROSS-REFERENCE TO RELATED APPLICATIONS

This application is a U.S. national stage application under 35 U.S.C. § 371 of PCT Application No. PCT/EP2020/084823, filed on Dec. 7, 2020, and published as WO 2021/115995 A1 on Jun. 17, 2021, which claims priority from German Application No. DE 10 2019 219 395.1, filed on Dec. 12, 2019, the entirety of which are each hereby fully incorporated by reference herein.

FIELD

The present invention relates to an operating device for a vehicle, a vehicle, in particular a motorcycle, and a method for operating a vehicle.

BACKGROUND AND SUMMARY

Twistgrips are used on motorcycles, for example, as operating elements for manually controlling the throttle.

Based on this, the present invention results in an improved operating device for a vehicle, an improved vehicle, and an improved method for operating a vehicle according to the independent claims. Advantageous designs can be derived from the dependent claims and the following description.

According to some designs, a vehicle can have an operating device that exhibits a variable feel and a so-called hands-on-detection (HOD). A magnetorheological medium, e.g. a magnetorheological fluid, can be advantageously used in conjunction with an operating device for a vehicle that has an outer unit that can be rotated by a user in order to provide the variable feel. The force needed to move the outer unit can be set in a nearly continuously variable manner via the magnetorheological medium. According to some embodiments, the control signal output by the operating device is affected when the user's hand is removed from the operating device, in particular the outer unit. This results in a safer and more reliable operation of the vehicle.

An operating device for a vehicle has the following features:

- an outer unit that can be rotated manually by the user of the operating device;
- a detection device that is configured to detect a movement of the outer unit and generate a control signal for a vehicle function based on a value corresponding to this movement;
- an actuator unit containing a magnetorheological medium, which is or can be coupled to the outer unit and is configured to exert a retaining force on the outer unit based on the viscosity of the magnetorheological medium;
- a sensor unit located in the outer unit, which is configured to generate a hand signal indicating the absence of the user's hand on the outer unit of operating device; and
- a manipulating device that acts on the control signal based on the hand signal.

The vehicle can be a motorized cycle such as a motorcycle or scooter, some other type of land vehicle, aircraft, or watercraft. The accelerator or brakes for the vehicle can be operated via the operating device, for example. The outer unit can take the form of a hollow shaft. The outer unit can form a handle. Alternatively, the outer unit can be designed to be coupled to a handle. In this case, a handle can be placed on the outer unit, or the outer unit can be encased in a handle. The handle, or outer unit, can be shaped such that it allows a driver of the vehicle to move the handle and/or the outer unit by hand. By way of example, the outer unit can also be encompassed in a hand with an additional handle. The outer unit, as well as the additional handle, can then be rotated and/or moved linearly. The outer unit can be or is connected to the handlebars of the vehicle for this via an appropriate bearing system. Depending on the retaining force, the outer unit and the optional handle can be moved more or less easily from the perspective of the operator, in that it is possible to adjust this force in a nearly continuous manner by adjusting the viscosity of the magnetorheological medium. It is possible in this manner to adjust the actuating force necessary for moving the outer unit and the optional handle to a current driving situation, the current operating functionality of the operating device, or to the preferences of the vehicle operator. The magnetorheological medium can be a medium comprising particles that can be magnetically polarized. In particular, this can be a magnetorheological fluid (MRF), such as that already used for various vehicle applications. Alternatively, it can be a magnetorheological elastomer. The actuator unit can be configured to adjust the viscosity of the magnetorheological medium based on the strength of a magnetic field acting on the magnetorheological medium. A higher viscosity results in a higher retaining force. The detection device can contain a sensor configured to detect movement, e.g. a Hall sensor. The control signal can be sent to an interface for a control unit in the vehicle or to a vehicle bus. A functional unit for the detection device can also be obtained in a control unit. In this manner, the operating device can be integrated in the vehicle control. The sensor unit can be encompassed by the outer unit when the operating device is installed. The sensor unit can be configured to detect the presence or absence of a user's hand on the outer unit. If the absence thereof has been detected, the hand signal can exhibit a first signal value and/or signal curve. In this manner, the first signal value and/or signal curve can indicate the absence. If the presence is detected, the hand signal can exhibit a second signal value and/or curve, which differs from the first. The second signal value and/or signal curve can indicate the presence. The sensor unit can contain a film for detecting the presence or absence of the hand. The sensor can be used to detect a hand encompassing the outer unit. The manipulating device can be configured to have a direct or indirect effect on the control signal. The manipulating device can be configured to act on the control signal in response to the signal indicating the absence of a hand on the outer unit. If the manipulating device has an effect on the control signal, the control signal can be brought to a value of 0, or some other neutral value, or a value representing a neutral setting of the outer unit.

In addition to functions such as accelerating and/or braking, the operating device can also enable implementation of a so-called launch control, with which the outer unit regulates the user's force, such that the optimal torque can be applied. The operating device can also form a circuit with which the user has the possibility of exceeding a defined force in one or the other direction, to thus shift gears in the one or the other direction.

According to one embodiment, the manipulating device can contain a reset unit for returning the outer unit to a neutral position. The neutral position can correspond to a position where the outer unit, and therefore the operating device, has not been actuated. Such an embodiment has the advantage that it is possible to obtain an operating device with a variable feel and an automatic return for operating a vehicle. In other words, an operating device can be obtained that has a reset unit for the outer unit and an integrated sensor unit for detecting the presence of a hand. The reset unit can be used to automatically return the outer unit, or rotating unit, to its neutral position, which may be of particular advantage with an outer unit that has an asymmetrical axis of rotation.

The reset unit can be configured in this case to return the outer unit to its neutral setting mechanically and/or electrically. The reset unit can also be connected to the outer unit with a gear system. By way of example, the reset unit can contain an electric motor that can be connected to the outer unit via the gear system. The reset unit can also contain a torsion spring or some other elastic element. Such an embodiment has the advantage that the return movement of the outer unit is obtained in a reliable and structurally simple manner.

According to one embodiment, the manipulating device can also be the detection device. In this case, the manipulating device can be configured to generate a control signal representing the neutral position of the outer unit based on the hand signal. In other words, the detection device can be configured to act on the value of the control signal in response to a hand signal indicating the absence of a hand. This embodiment has the advantage that there is no need to return the outer unit if the outer unit, or handle, is symmetrical in relation to the axis of rotation, and instead, the control signal can be manipulated directly in a simple manner.

The operating device can also contain at least one light source for lighting the outer unit from the inside. The light source can be located within the outer circumference of the outer unit. This light source can rotate conjointly with the outer unit. The light source can contain at least one light emitting diode or the like. Such an embodiment has the advantage that the detection precision of the sensor unit for detecting a hand can be increased.

The actuator unit can be configured to adjust the viscosity of the magnetorheological medium using an adjustment signal. The retaining force can be altered by adjusting the viscosity. A change in the viscosity can lead to a change in the retaining force in this manner. By way of example, the adjustment signal can be used to operate a device that generates a magnetic field in the actuator unit, or it can be used to generate a signal for operating a corresponding device for generating a magnetic field. The retaining force and therefore the force needed by the operator of the vehicle can be quickly and easily adjusted using the adjustment signal.

The operating device can have an adjusting device for this that is configured to generate the adjustment signal. By way of example, the adjusting device can be configured to generate the adjustment signal using a speed signal indicating the speed at which the vehicle is travelling. The retaining force can thus be set on the basis of the vehicle's speed. By way of example, the actuating force needed by the operator of the vehicle can be selected such that it is greater when the vehicle is travelling at a higher speed. The adjusting device can also be configured to generate the adjustment signal using a preset speed signal that indicates a preset speed for the vehicle. The preset speed can be a speed specified by a speed control, or it can be the maximum speed of the vehicle, or it can represent a distance travelled by the vehicle. By way of example, the retaining force can be abruptly increased when this preset speed is reached. The operator is notified of when the preset speed has been reached by this means. The adjusting device can also be configured to generate the adjustment signal using a signal indicating the rotational rate of the vehicle motor. By way of example, the retaining force can be increased when the motor is no longer operating at an optimal rotational rate with regard to fuel consumption or power. This encourages the operator to operate the motor in an optimal range. The adjusting device can also be configured to generate the adjustment signal using a preset rotational rate signal indicating a preset rotational rate for the vehicle motor. This preset rotational rate can be the maximum rotational rate or the optimal rotational rate with regard to the operating properties of the vehicle or its motor.

According to one embodiment, the outer unit can move in a first rotational direction. The actuator unit can be configured to exert a retaining force on the outer unit for dampening a rotational movement of the outer unit in the first direction. This makes it possible to set the outer unit via the actuator unit such that it can be rotated in the first direction with ease, with difficulty, or not at all. By way of example, the power output of the vehicle motor can be increased by rotating the outer unit in the first direction. This results in the functionality of a throttle twistgrip.

The outer unit can also be designed to rotate in a second direction, opposite the first. The actuator unit can then be configured to exert a retaining force on the outer unit for dampening a rotational movement of the outer unit in the second direction. The retaining force for dampening the rotational movement in the second direction can differ from the retaining force for dampening the rotational movement in the first direction, or the dampening forces can be the same. The second direction of rotation can be used for a vehicle braking function, for example.

By way of example, the detection device can be configured to detect a direction of the movement as the characterizing value. Different directions can be assigned to different operating functions, such that it is possible to determine which operating function the vehicle operator is exercising via the direction of the movement. The detection device can also be configured to detect the speed of the movement as the characterizing value. By way of example, an abrupt movement can be assigned to a different operating function than a smooth movement. The detection device can also be configured to detect a temporal course of the movement as the characterizing value. This temporal course can indicate the length of the movement in one direction, or a change in the direction of movement. By way of example, a quick change in the direction of movement can be assigned to another operating function. A brief movement of the outer unit in one direction followed immediately by a movement in the other direction can therefore indicate a gear change desired by the vehicle operator.

The detection device can therefore be configured to generate the control signal to control the power output of the vehicle motor. The detection device can also be configured to generate the control signal to control the rotational rate of the vehicle motor. This results in the functionality of a throttle twistgrip. The detection device can also be configured to generate the control signal to control the vehicle's speed. The detection device can also be configured to generate the control signal to control the vehicle's acceleration. This facilitates control of the vehicle, e.g. in conjunction with an automatic transmission. The detection device can also be configured to generate the control signal to control the vehicle's transmission. This allows the operator of vehicle to select a specific gearing. The detection device can also be configured to generate the control signal to control the vehicle's braking. This eliminates the need for a separate brake lever.

According to one embodiment, the actuator unit can be configured to support the outer unit such that it can move. This eliminates the need for a separate mechanical bearing.

The outer unit can also comprise a handle with a first moving handle section and a second moving handle section. The actuator unit can also comprise a first actuator with a first magnetorheological medium and a second actuator with a second magnetorheological medium. The first actuator can be coupled to the firsts handle section and configured to exert a first retaining force based on the viscosity of the first magnetorheological medium. The second actuator can be coupled to the second handle section and configured to exert a second retaining force based on the viscosity of the second magnetorheological medium.

A vehicle, in particular a motorized cycle, can comprise the aforementioned operating device. By way of example, the operating device can replace the conventional twistgrip on the vehicle.

A method for operating such a vehicle comprises the following steps:
  setting the viscosity of the magnetorheological medium in the actuator unit in the vehicle operating device;
  detecting a value that characterizes the movement of the outer unit on the operating device; and
  generating a control signal to control a vehicle's function using the characterizing value.

The steps of the method can be implemented in a device that can be part of the operating device or part of a control unit for the vehicle. Such a device can be an electrical device that processes electrical signals such as sensor signals, and outputs control signals on the basis thereof. The device can have one or more interfaces, which can be in the form of hardware or software. Hardware interfaces can be part of an integrated circuit in which the device functions are implemented. The interfaces can also be separate integrated circuits, or be composed, at least in part, of discrete components. Software interfaces can be software modules on a microcontroller that also has other software modules.

According to one embodiment, the method can comprise a step for detecting the absence of a user's hand on the operating device outer unit, a step for generating a hand signal indicating the absence of the hand, and a step in which the control signal is manipulated on the basis of this hand signal. In the detecting step, the sensor unit on the operating device can be used. In this manner, the presence or absence of a hand can be detected, and the control signal can be set appropriately if no hand is detected on the outer unit.

A computer program containing program code that can be stored on a machine-readable medium such as a semiconductor memory, a hard disk or an optical memory, and used to execute the method according to any of the embodiments described above when the program is executed on a computer or a device.

The invention shall be explained in greater detail in reference to the attached drawings.

BRIEF DESCRIPTION OF THE DRAWINGS

The same or similar reference symbols are used in the following description of preferred exemplary embodiments of the present invention for the elements shown in the various figures that have similar functions, wherein there shall be no repetition of the descriptions of these elements.

DETAILED DESCRIPTION

Figure 1:
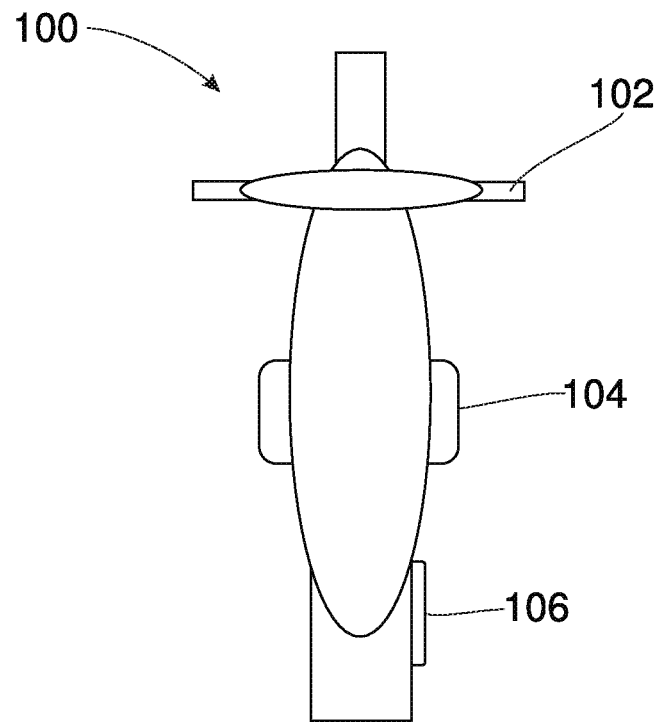
FIG. 1 shows a vehicle with an operating device according to an exemplary embodiment.

FIG. 1 shows a vehicle 100 that has an operating device 102 according to an exemplary embodiment. Merely by way of example, the vehicle 100 is a motorcycle. The vehicle 100 in this exemplary embodiment has handlebars. The operating device 102 is located on the right-hand end of the handlebars. The operating device 102 can be operated by a vehicle's 100 operator, e.g. to control the power output of the vehicle's 100 motor 104. According to various exemplary embodiments, the operating device 102 also enables control of the vehicle's brakes 106 and/or the vehicle's 100 transmission. The operating device 102 is used instead of a conventional throttle twistgrip, and comprises an outer unit in the form of a handle, and an actuator unit. According to one exemplary embodiment, the outer unit, or handle, can be held and rotated manually by a vehicle's 100 operator. According to one exemplary embodiment, the operating device 102 also comprises a detection device, a sensor unit, and a manipulating device.

Instead of a motorcycle or scooter, the operating device 102 can also be used with some other land, air, or water vehicle, e.g. a quad bike, electric bicycle, e-scooter, or helicopter.

Figure 2A:
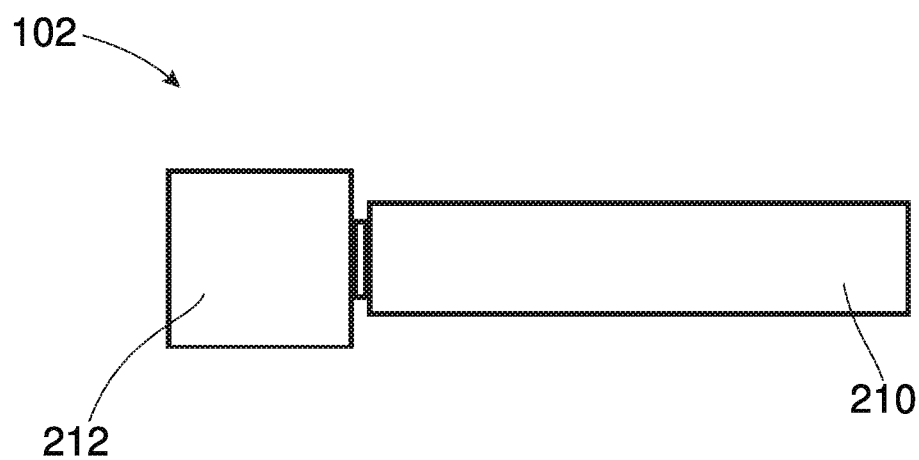
FIG. 2A shows a schematic illustration of an operating device 102 according to an exemplary embodiment.

FIG. 2A shows a side view of an operating device 102 according to an exemplary embodiment. This can be an exemplary embodiment of the operating device shown in FIG. 1. The operating device 102 has an outer unit forming a handle 210, and an actuator unit 212. The handle 210 can move on a bearing formed, e.g., by the actuator 212, or an additional bearing.

A housing for the actuator unit 212 can be rigidly fixed in place on the handlebars for the motorcycle shown in FIG. 1. As a result, the handle 210 can be moved in relation to the housing for the actuator unit 212 and therefore in relation to the handlebars.

The actuator unit 212 is configured to exert an adjustable retaining force on the handle 210. The retaining force acts against a force moving the handle 210, exerted by an operator's hand on the handle 210. Depending on how strong the retaining force is, this retaining force may feel negligible or clearly substantial to the driver. According to one exemplary embodiment, the handle 210 may be fixed in place from the perspective of the operator when the retaining force is at a maximum.

The actuator unit 212 is also referred to as an MRF actuator. To set the retaining force to a currently necessary value, the actuator 212 contains a magnetorheological medium, e.g. a magnetorheological fluid. The viscosity of the magnetorheological medium can be altered. The retaining force is obtained from the friction between the magnetorheological medium and the handle 210, or a shaft coupled to the handle 210. When the viscosity of the magnetorheological medium is higher, the magnetorheological medium exerts a stronger retaining force on the handle 210 than with a lower viscosity, in an exemplary embodiment.

The viscosity of the magnetorheological medium is adjusted in an exemplary embodiment by a magnetic field acting on the magnetorheological medium. The strength of the magnetic field can be adjusted for this, in order to adjust the viscosity of the magnetorheological medium. By way of example, the actuator unit 212 can contain an electromagnet or a moving permanent magnet to generate the magnetic field.

According to one exemplary embodiment, the actuator unit 212 comprises a reset unit for the handle 210, or the outer unit. This reset unit mechanically and/or electronically returns the handle to its original position. The reset unit is explained in greater detail below in reference to FIGS. 2B through 2E.

The operating device 102 according to various exemplary embodiments forms a regulator for accelerating and braking a motorcycle with a variable feel implemented by an MRF actuator in the actuator unit 212. The operation thereof is just like that of traditional accelerator for a motorcycle. The operator rotates the handle in order to accelerate. When the module is rotated in the other direction by the operator, the vehicle is decelerated.

According to one exemplary embodiment, the operating device 102 forms a throttle twistgrip, in which the handle 210 is coupled to an MRF actuator. This makes it possible to obtain different feels and resistances. This also makes it possible to obtain numerous operating functions that can be executed with a twistgrip. As such, the system can lock the handle in place at a specific speed, e.g. between thirty and forty km/h, such that it is impossible to drive faster. According to one exemplary embodiment, this locking is obtained such that it can be overcome by applying greater force, thus allowing for evasive maneuvers in emergency situations. The operating device 102, also referred to as a twistgrip, can comprise both the accelerator and the brake actuator. When the handle 210 is rotated in one direction, the vehicle is accelerated. When the handle 210 is rotated in the other direction, the vehicle is braked.

Figure 2B:
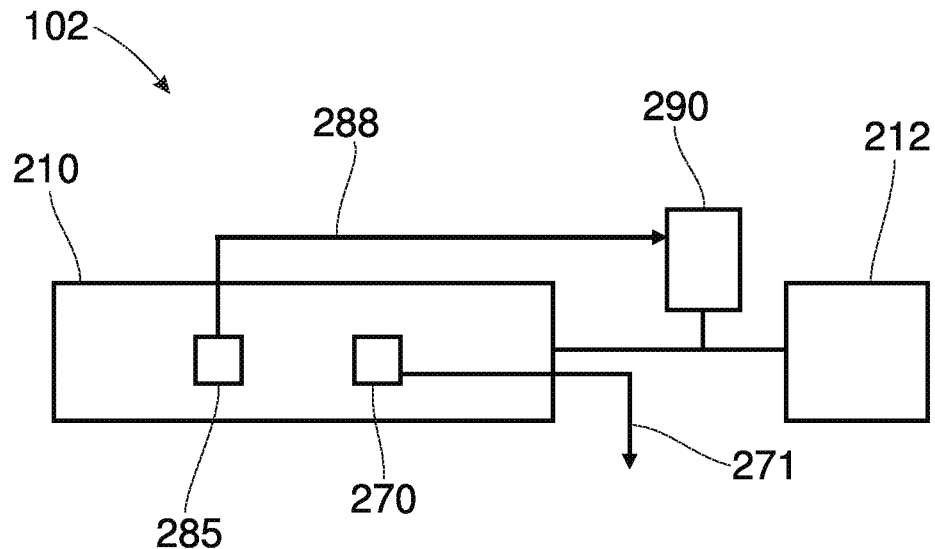
FIG. 2B shows a schematic illustration of an operating device according to an exemplary embodiment.

FIG. 2B shows a schematic illustration of an operating device 102 according to an exemplary embodiment. This can be an exemplary embodiment of the operating device shown in FIG. 1. The operating device 102 is similar to the operating device in FIG. 2A. In addition to the outer unit in the form of a handle 210, and the actuator unit 212, the operating device 102 for a vehicle according to the exemplary embodiment shown in FIG. 2B also contains a detection device 270, a sensor unit 285, and a reset unit 290 that functions as a manipulating device. A control signal 271 and a hand signal 288 are also shown.

The outer unit forming a handle 210 can be rotated manually by a user of the operating device 102. The actuator unit 212 containing the magnetorheological medium is coupled to the outer unit that forms the handle 210. The actuator unit 212 is configured to exert a retaining force on the outer unit forming the handle 210 based on the viscosity of the magnetorheological medium.

The detection device 270 is configured to detect a movement of the outer unit forming the handle 210. The detection device 270 is also configured to generate the control signal 271 using a value that characterizes the movement. The control signal 271 is used to control a vehicle's function. The operating device 102 is configured to output the control signal 271 to at least one device in the vehicle.

The sensor unit 285 is located in or within the outer unit forming the handle 210. This sensor unit 285 is therefore encompassed by the outer unit forming the handle 210. The sensor unit 285 is configured to detect the absence of a user's hand on the outer unit forming the handle 210 of the operating device 102. The sensor unit 285 is also configured to generate a hand signal 288 that indicates a detected absence.

The reset unit 290 is configured to return the outer unit forming the handle 210 to a neutral position. The reset unit 290 is configured to input the hand signal 288 from the sensor unit 285. The reset unit 290 is also configured to return the outer unit forming the handle 210 to the neutral position on the basis of the hand signal 288. The movement of the outer unit forming the handle 210, and therefore the control signal 271, can be manipulated by the return to the neutral position. According to the exemplary embodiment shown in FIG. 2B, the reset unit 290 therefore functions as a manipulating device that acts on the control signal 271 on the basis of the hand signal 288. In other words, the manipulating device according to the exemplary embodiment shown in FIG. 2B contains the reset unit 290. The reset unit 290 is configured to mechanically and/or electronically return the outer unit forming the handle 210 to the neutral position.

Figure 2C:
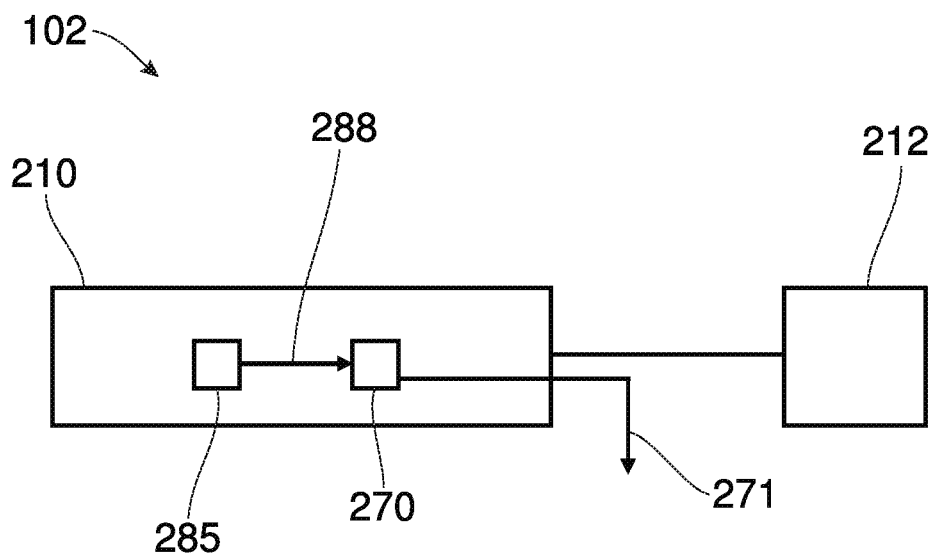
FIG. 2C shows a schematic illustration of an operating device according to an exemplary embodiment.

FIG. 2C shows a schematic illustration of an operating device 102 according to an exemplary embodiment. In this case, the operating device in FIG. 2C corresponds to the operating device in FIG. 2B with the exception that the detection device 270 functions as a manipulating device. The detection device 270 is configured to input the hand signal 288 from the sensor unit 285. The detection device 270 is also configured to generate a control signal 271 based on the hand signal 288 that represents a neutral position of the outer unit forming the handle 210. In the exemplary embodiment shown in FIG. 2C, the outer unit forming the handle 210 is symmetrical with respect to its axis of rotation.

Figure 2D:
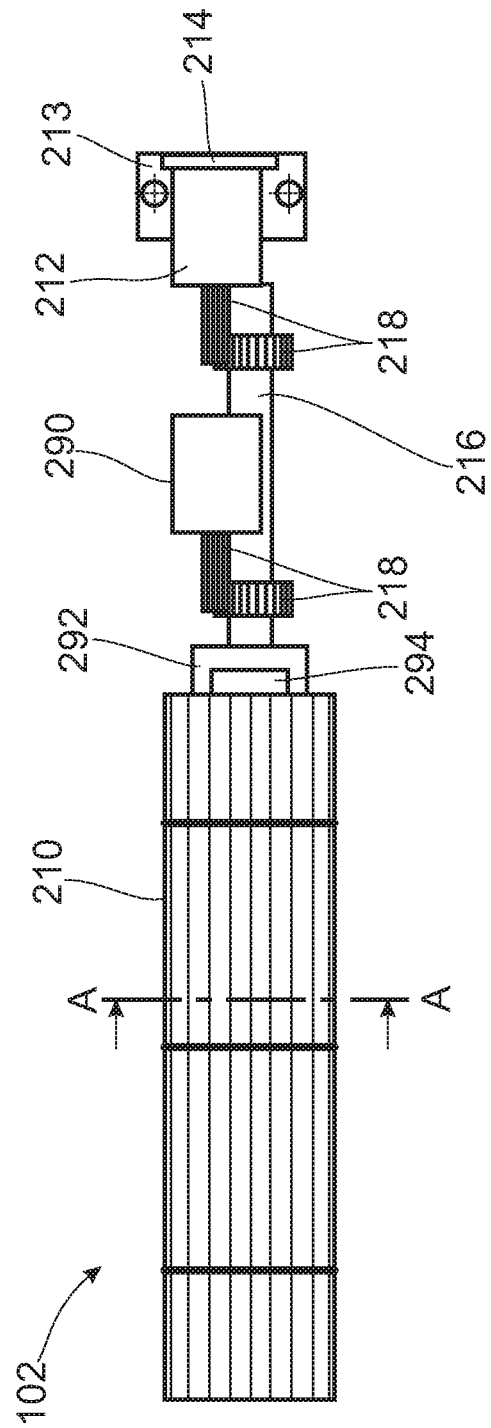
FIG. 2D shows a schematic illustration of an operating device according to an exemplary embodiment.

FIG. 2D shows a schematic illustration of an operating device 102 according to an exemplary embodiment. The operating device 102 in FIG. 2D corresponds to the operating device in FIG. 2B. In this case, the outer unit forming the handle 210, the actuator unit 212, the reset unit 290, an actuator mount 213, and actuator control unit 214, a rotating shaft 216, a gearing 218 with gearwheels, a carrier 292 and an electronics unit 294 for the operating device 102 in FIG. 2D are shown. The outer unit forming the handle 210 forms a hollow shaft. The reset unit 290 is an electrical reset unit. There is also a cutting line A-A, which represents a plane that cuts through the operating device 102.

The outer unit forming the handle 210 is connected to the shaft 216. The shaft 216 is connected or coupled to the actuator via gearwheels in the gearing 218. The reset unit 290 is connected to the shaft 216 via further gearwheels in the gearing 218. The reset unit 290 is therefore connected to the outer unit forming the handle 210 via the gearing 218. The actuator unit 212 is also connected to the outer unit forming the handle 210 via the gearing 218. The actuator unit 212 is or can be attached to the vehicle by means of the actuator mount 213. The actuator control unit 214 is configured to control or activate the actuator unit 212. The actuator control unit 214 can contain an adjusting device that shall be explained below in reference to the figures, or it can form this adjusting device.

The carrier 292 is designed to support the electronics unit 294. The carrier 292 is stationary or connected for conjoint rotation with respect to the outer unit forming the handle 210. The carrier 292 and the electronics unit 294 can be located at least in part within the outer unit forming the handle 210. The electronics unit 294 contains a circuit carrier, circuit substrate, or printed circuit board, by way of example. The detection device and/or sensor unit are located on the electronics unit 294.

In other words, the rotating outer unit forming the handle 210, which is in the form of a hollow shaft, forms a throttle or operating element for accelerating a motorized cycle according to the exemplary embodiment shown here. The operating device 102 contains an actuator unit 212, which is connected to the outer unit via the gearing 218, thus adjusting the feel of the rotating outer unit in a variable manner. The operating device 102 also comprises the sensor unit for detecting a hand encompassing the outer unit, which is located inside the hollow shaft, or outer unit. The electrical reset unit 290, which can also be mechanical, e.g. using a torsion spring, is also connected to the outer unit on the operating device 102 by means of the gearing 218.

Figure 2E:
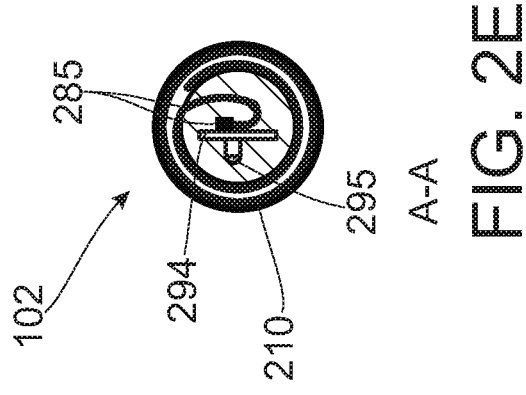
FIG. 2E shows a cross section view of the operating device shown in FIG. 2D.

FIG. 2E shows a cross sectional view of the operating device 102 from FIG. 2D. This shows the operating device 102 cut along the line A-A or cutting plane A-A in FIG. 2D. The illustration in FIG. 2E shows the outer unit forming the handle 210, the sensor unit 285, the electronics unit 294, and at least one light source 295 in the operating device 102.

The sensor unit 285, electronics unit 294 and at least one light source 295 are encompassed by the outer unit forming the handle 210 here. The sensor unit 285 is located on the electronics unit 294. The sensor unit 285 contains an electronics module connected to the electronics unit 294, and a film that forms a hand detection sensor. The at least one light source 295 is also located on the electronics unit 294. The at least one light source 295 is in the form of a light emitting diode, by way of example. The at least one light source 295 lights the outer unit forming the handle 210 from the inside. According to this exemplary embodiment, the electronics module for the sensor unit 285 and the at least one light source 295 are located on opposite sides of the electronics unit 294. The film for the sensor unit 285 is wound in a spiral around the electronics unit 294 starting from the electronics module for the sensor unit 285.

Figure 3:
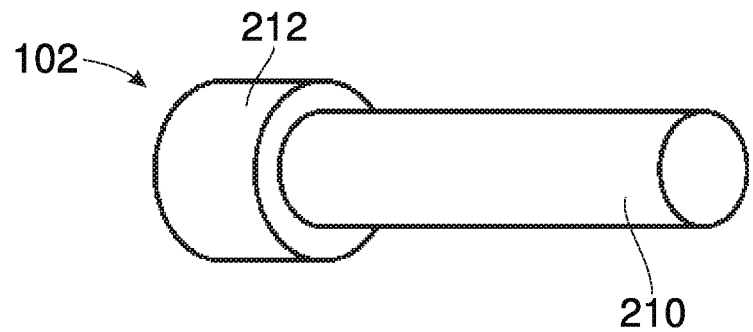
FIG. 3 shows an illustration of an operating device according to an exemplary embodiment.

FIG. 3 shows a three dimensional illustration of an operating device 102 according to an exemplary embodiment. This can be any of the operating devices described in reference to FIGS. 2A to 2E.

The handle 210 in this exemplary embodiment is cylindrical. The handle 210 has an exposed end. The other end of the handle 210 is coupled to the actuator unit 212. By way of example, the actuator unit 212 has a cylindrical housing.

According to various exemplary embodiments, the handle 210 can rotate about its longitudinal axis and/or be slid along its longitudinal axis.

The handle 210 can be used as a throttle, for example, for accelerating the vehicle. The handle 210 can also act as a speed control or speed limiter. According to one exemplary embodiment, the handle 210 can also be used as a brake for the vehicle, or to shift gears.

Figure 4:
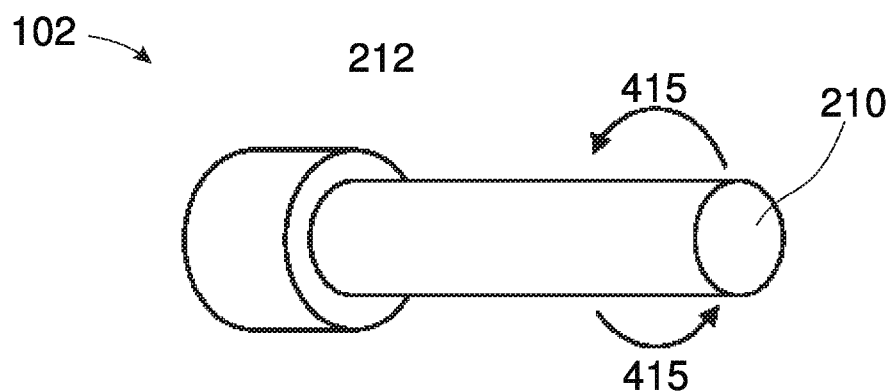
FIG. 4 shows an illustration of a movement of a handle on an operating device according to an exemplary embodiment.

FIG. 4 illustrates the movement of the handle 210 on an operating device 102 according to an exemplary embodiment. This operating device can be any of the operating devices described above in reference to preceding figures. A rotation of the handle 210 in a first direction of rotation 415 is shown. The rotation is caused, for example, by the movement of an operator's hand encompassing the handle 210.

Depending on the viscosity of the magnetorheological medium in the actuator unit 212, a greater or lesser retaining force acts on the handle 210. The retaining force dampens the rotation of the handle 210, in this case with respect to the first direction of rotation.

Figure 5:
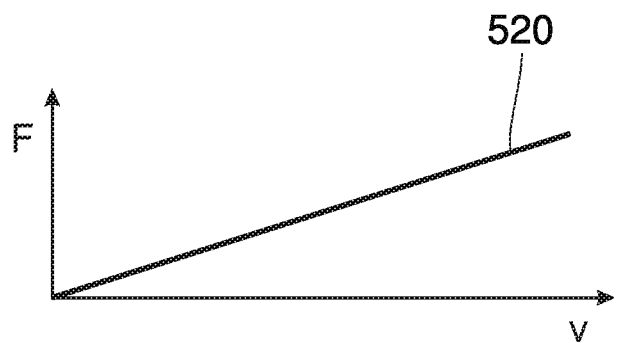
FIG. 5 shows a graph plotting a retaining force for an operating device as a function of the vehicle's speed according to an exemplary embodiment.

FIG. 5 shows a graph plotting the retaining force 520 for an operating device as a function of the vehicle's speed according to an exemplary embodiment. The vehicle's speed is plotted on the x-axis, and the retaining force exerted on the handle by the actuator unit shown in FIG. 4, for example, and acting against the rotation of the handle in the first direction, is plotted on the y-axis. According to this exemplary embodiment, the value for the retaining force is set as a function of the vehicle's speed. According to another exemplary embodiment, there is a predefined relationship between the value for the vehicle's speed and the value for the retaining force, in which the retaining force increases tendentially as the vehicle's speed increases.

According to the exemplary embodiment shown here, there is a linear relationship between the value for the vehicle's speed and the value for the retaining force. By way of example, with a starting speed of, e.g., 10 km/h, the retaining force has a starting value of 0.5 Nm, and increases linearly to an end value of, e.g., 5 Nm at an end speed of 200 km/h.

According to this exemplary embodiment, the handle is rotated in the first direction in order to accelerate the vehicle. The actuator unit controls the retaining forces with the magnetorheological medium such that higher speeds result in stronger forces needed to rotate the handle.

Figure 6:
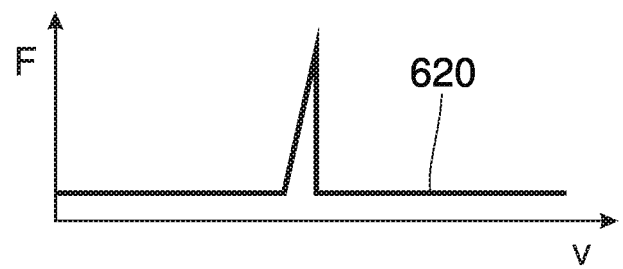
FIG. 6 shows a graph plotting a retaining force for an operating device as a function of the vehicle's speed according to an exemplary embodiment.

FIG. 6 shows a graph plotting a retaining force 620 for an operating device as a function of the vehicle's speed according to an exemplary embodiment. The vehicle's speed is plotted along the x-axis, and the retaining force exerted on the handle by the actuator unit shown in FIG. 4, for example, and acting against the rotation of the handle in the first direction, is plotted along the y-axis. According to this exemplary embodiment, a value for the retaining force is set on the basis of the vehicle's speed. According to one exemplary embodiment, the retaining force has a constant value over the range of speeds that are shown, with the exception of a peak at a preset speed.

By way of example, the retaining force has a starting value of, e.g., 0.5 Nm in a speed range of, e.g., 10 km/h to 100 km/h. Shortly before reaching a preset speed, e.g. 50 km/h, the retaining force increases to an end value of, e.g., 5 Nm. After reaching or exceeding the preset speed, the retaining force decreases abruptly to the starting value. The peak retaining force extends along the x-axis over less than 20% or less than 10% of the preset speed, for example.

According to this exemplary embodiment, the rotation of the handle in the first direction is used for acceleration, and the handle also assumes the function of a speed control or speed limiter. The actuator unit controls forces using the magnetorheological medium in this case such that a strong force is needed to move the handle when a specific speed has been reached, and an attempt is then made to drive even faster.

Figure 7:
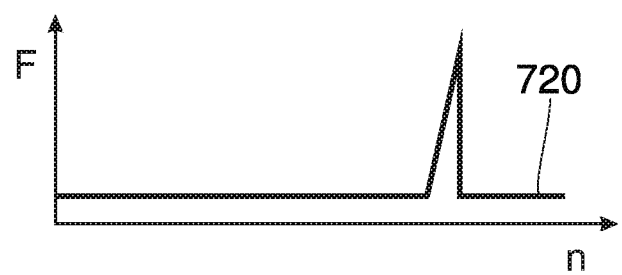
FIG. 7 shows a graph plotting a retaining force for an operating device as a function of the rotational rate of the motor according to an exemplary embodiment.

FIG. 7 shows a graph plotting the retaining force 720 for an operating device as a function of the rotational rate of the motor according to an exemplary embodiment. The rotational rate of the motor is plotted along the x-axis, and the retaining force exerted on the handle, for example, by the actuator unit shown in FIG. 4, and acting against rotation of the handle in the first direction, is plotted along the y-axis. According to this exemplary embodiment, the value for the retaining force is set as a function of the rotational rate of the motor. According to one exemplary embodiment, the retaining force has a constant value over the entire range of the rotational rate of the motor, except for a peak at a preset rotational rate.

By way of example, the retaining force in a rotational rate ranging from 1,000 rpm to 14,000 rpm has a starting value of 0.5 Nm, for example. Shortly before reaching the preset rotational rate, at 10,000 rpm, for example, the retaining force increases to an end value of 5 Nm, for example. After reaching or exceeding the preset rotational rate, the retaining force drops abruptly back to the starting value. The peak retaining force extends along the x-axis over less than 1% of the preset rotational rate for the motor, for example.

According to this exemplary embodiment, the rotation of the handle in the first direction is used to increase the rotational rate of the vehicle's motor, and the handle also has a kickdown function here. The actuator unit controls the forces using the magnetorheological medium in this case such that the rotational rate of the motor is regulated up to a specific range via the handle. Starting at a threshold, a resistance must be overcome, starting at which the full potential of the rotational rate range is queried.

Figure 8:
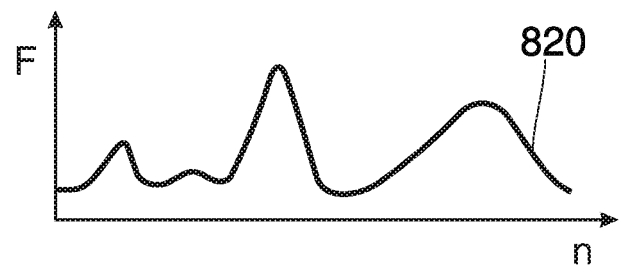
FIG. 8 shows a graph plotting a retaining force for an operating device as a function of the rotational rate of the motor according to an exemplary embodiment.

FIG. 8 shows a graph plotting the retaining force 820 for an operating device as a function of the rotational rate of the motor according to an exemplary embodiment. The rotational rate of the motor is plotted along the x-axis and the retaining force exerted on the handle by the actuator unit shown in FIG. 4, for example, and acting against the rotation of the handle in the first direction, is plotted along the y-axis. According to this exemplary embodiment, a value for the retaining force is set as a function of the rotational rate of the motor. According to one exemplary embodiment, the retaining force has a predetermined wave curve over the entire rotational rate that is shown.

By way of example, the retaining force has a starting value of, e.g., 0.5 NM at a starting rotational rate for the motor of, e.g., 1,000 rpm, and drops back to the starting value at an end rotational rate of, e.g., 14,000 rpm. The retaining force curve 820 has numerous maximums between these rotational rates, lying between the starting value and an end value of, e.g., 5 Nm. By way of example, the retaining rate curve 820 has four maximums, only one of which reaches the end value for the retaining force.

According to this exemplary embodiment, the handle is rotated in the first direction to increase the rotational rate of the vehicle's motor, and the handle also has a launch control function. This function comprises traction control with which a technologically optimized vehicle performance is obtained.

The actuator unit controls the retaining forces using the magnetorheological medium in this case such that the optimal rotational rate range is provide to the operator for an optimal start, and slippage is minimized.

Figure 9:
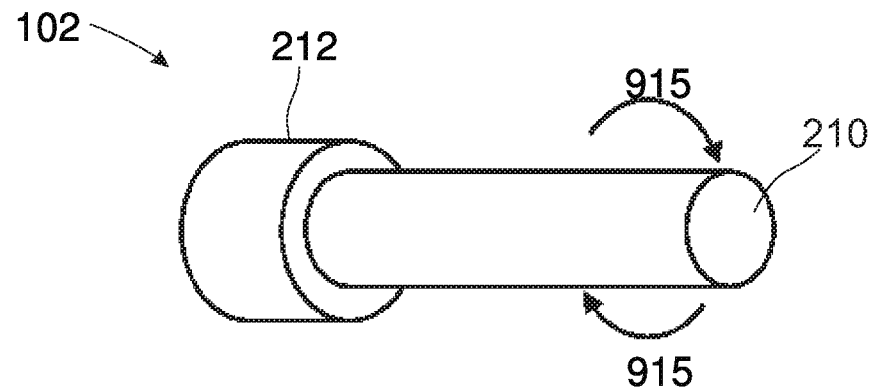
FIG. 9 illustrates a movement of the handle on an operating device according to an exemplary embodiment.

FIG. 9 illustrates a movement of the handle 210 on an operating device 102 according to an exemplary embodiment. This can be the operating device described in reference to any of the preceding figures. The handle 210 is rotated in a second direction 915 in the illustration, which is opposite the first direction, which is shown in FIG. 4. The handle is rotated, for example, by an operator's hand encompassing the handle 210.

Depending on the viscosity of the magnetorheological medium, the actuator unit 212 exerts a greater or lesser retaining force on the handle 210. The retaining force dampens the rotation of the handle 210 in the second direction in this case.

The actuator unit 212 is configured to exert the same or different retaining forces in the different directions of rotation, depending on the exemplary embodiment.

Figure 10:
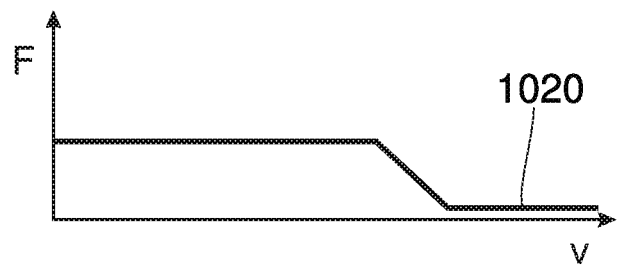
FIG. 10 shows a graph plotting a retaining force for an operating device as a function of the rotational rate of the motor according to an exemplary embodiment.

FIG. 10 shows a graph plotting a retaining force 1020 for an operating device as a function of the vehicle speed according to an exemplary embodiment. The vehicle speed is plotted along the x-axis and the retaining speed exerted on the handle by the actuator unit shown in FIG. 9, for example, and acting against rotation of the handle in the second direction, is plotted along the y-axis. The vehicle speed decreases along the x-axis in this case. According to this exemplary embodiment the value for the retaining force is set as a function of the vehicle's speed. According to one exemplary embodiment, there is a specific relationship between the vehicle's speed and the retaining force, and the retaining force is reduced when the speed falls below an emergency braking speed.

According to this exemplary embodiment, the retaining force has a constant starting value of, e.g., 2 Nm in a speed ranging from 100 km/h to the emergency braking speed of, e.g., 30 km/h. When the speed falls below the end value, the retaining force drops in a linear manner, for example, to the end value of, e.g., 0.5 Nm, and then remains at this end value until reaching a standstill at 0 km/h.

According to this exemplary embodiment, the vehicle is braked by rotating the handle in the second direction. The actuator controls the forces in this case using the magnetorheological medium such that a braking effect is obtained by the rotational movement in the other direction. This rotational movement is opposite that in the first direction, which is used, e.g., for acceleration or increasing the rotational rate of the motor. The system responds in this case in a manner specific to braking. With an emergency braking, the forces are very weak. This means that only very weak forces must be overcome to rotate the handle in the second direction, thus facilitating a stronger braking effect.

Figure 11:
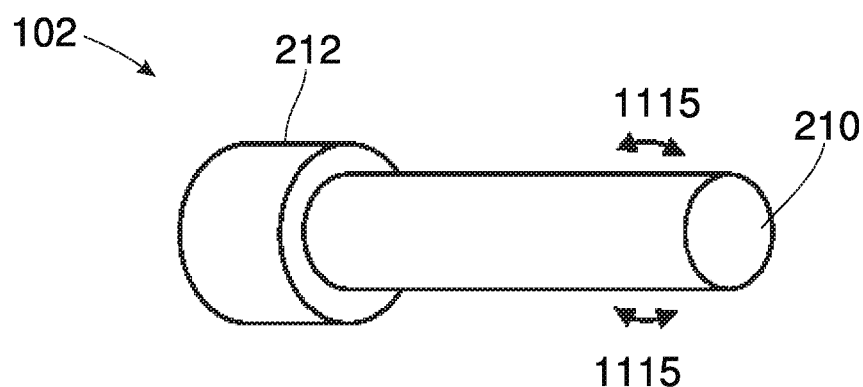
FIG. 11 illustrates a movement of the handle on an operating device according to an exemplary embodiment.

FIG. 11 illustrates a movement of the handle 210 on an operating device 102 according to an exemplary embodiment. This can be the operating device described in reference to any of the preceding figures. An alternating movement 1115 of the handle 210 is shown, composed of two brief, opposing and successive rotational movements. The alternating movement 1115 is obtained, e.g., through the movement of an operator's hand encompassing the handle 210.

Depending on the viscosity of the magnetorheological medium, the actuator unit 212 exerts a greater or lesser retaining force on the handle 210. The retaining force dampens the alternating movement 1115 of the handle 210 in both directions in this case.

According to this exemplary embodiment, the operating device 102 is used for shifting gears. The brief rotational movements in alternating directions 1115 generate a shifting signal for shifting gears. The rotations in each direction take place in quick succession for this, with the last direction indicating whether a higher or lower gear is shifted to.

Alternatively, only one brief rotation takes place, and this single rotation then indicates the shifting direction.

Figure 12:
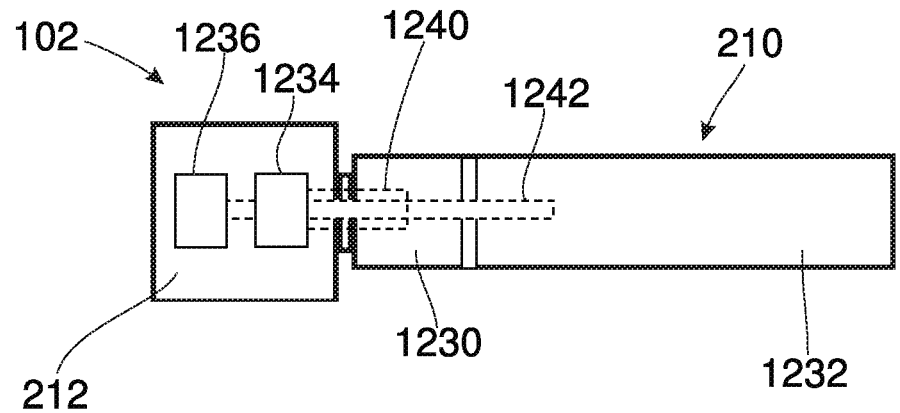
FIG. 12 shows an illustration of an operating device according to an exemplary embodiment.

FIG. 12 shows an illustration of an operating device 102 according to an exemplary embodiment. Unlike the operating devices described in reference to any of the preceding figures, the handle 210 on the operating device 102 shown in FIG. 12 has a first moving handle section 1230 and a second moving handle section 1232. In order to obtain different retaining forces on the different moving handle sections 1230, 1232, the actuator unit 212 has a first actuator 1234 and a second actuator 1236.

The first actuator 1234 contains a first magnetorheological medium and is configured to exert a first retaining force on the first handle section 1230 based on the viscosity of the first magnetorheological medium. The first actuator 1234 is coupled via a first shaft 1240, for example, to the first handle section 1230 for this. The second actuator 1236 contains a second magnetorheological medium and is configured to exert a second retaining force on the second handle section 1232 based on the viscosity of the second magnetorheological medium. The second actuator 1236 is coupled via a second shaft 1242, for example, to the second handle section 1232 for this.

By way of example, the first handle section 1230 can be shaped such that it can be operated by the thumb on an operator's hand. The second handle section 1232 can then be shaped such that it can be operated by the operator's hand. The second handle section 1232 can therefore be longer than the first handle section 1230, e.g., more than four times as long as the first section. The first handle section 1230 is located in this case between the actuator unit 212 and the second handle section 1232.

Figure 13:
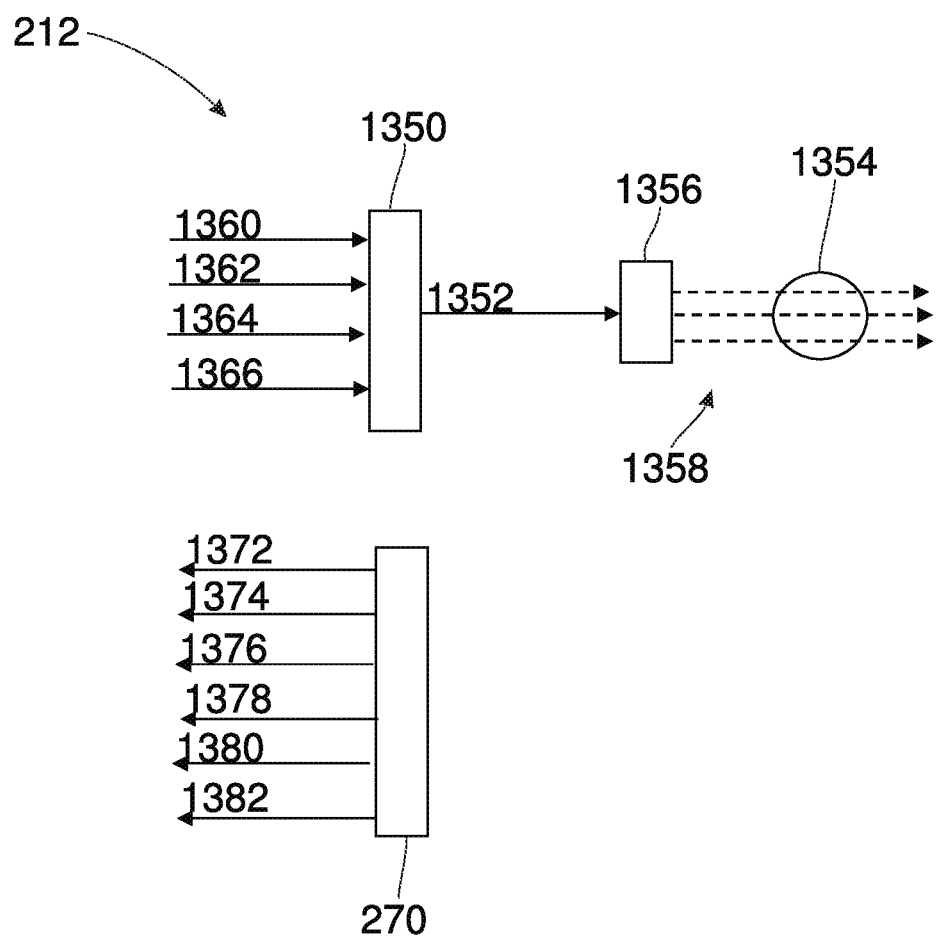
FIG. 13 shows a schematic illustration of an actuator unit according to an exemplary embodiment.

FIG. 13 shows a schematic illustration of an actuator unit 212 according to an exemplary embodiment. The actuator unit 212 can be used with an operating device like that shown in any of the figures described above.

According to one exemplary embodiment, the actuator unit 212 can also comprise an adjusting device 1350. The adjusting device 1350 is configured to generate an adjustment signal 1352 via which the viscosity of the magnetorheological medium 1354 used by an actuator in the actuator unit 212 can be adjusted. By way of example, the adjustment signal 1352 is sent to an interface for an electromagnet 1356 in the actuator unit 212 and is used to adjust the strength of the magnetic field generated by the electromagnet 1356 and acting on the magnetorheological medium 1354.

According to another exemplary embodiment, the adjusting device 1350 is configured to determine the adjustment signal 1352 using data relating to a state of the vehicle that is controlled via the operating device. These data can be obtained, for example, from a sensor system or a control unit in the vehicle. By way of example, the adjusting device 1350 is configured to generate the adjustment signal 1352 using a speed signal 1360 indicating the vehicle's speed, and/or using a preset speed signal 1362 indicating a preset speed of the vehicle, and/or using a rotational rate signal 1364 indicating a rotational rate of a vehicle's motor, and/or using a preset rotational rate signal 1366 indicating a preset rotational rate for a vehicle's motor.

According to an alternative exemplary embodiment, the adjustment signal 1352 is output directly to the actuator unit 212, e.g. from a control unit in the vehicle. In this case, the actuator unit 212 does not need an adjusting device 1350. The functionality of the adjusting device also does not need to be located in the housing of the actuator unit 212, and instead can be located in a control unit for the vehicle, for example.

According to one exemplary embodiment, the actuator unit 212 can also comprise an optional detection device 270. The detection device 270 is configured to detect a movement of the handle and generate a control signal for a vehicle function using a value that characterizes the movement of the handle. The detection device 270 contains a sensor system, for example, via which the direction of the movement of the handle and/or the speed of the movement, and/or a temporal and/or spatial course of the movement can be detected to form the characterizing value. By way of example, the detection device 270 is configured to generate a motor control signal 1372 to control the power output of the vehicle's motor, and/or a rotational rate control signal 1374 to control the rotational rate of the vehicle's motor, and/or a speed control signal 1376 to control the vehicle's speed, and/or an acceleration control signal 1378 to control the vehicle's acceleration, and/or a shifting control signal 1380 to control the vehicle's transmission, and/or a braking control signal 1382 to control the vehicle's brakes.

Figure 14:
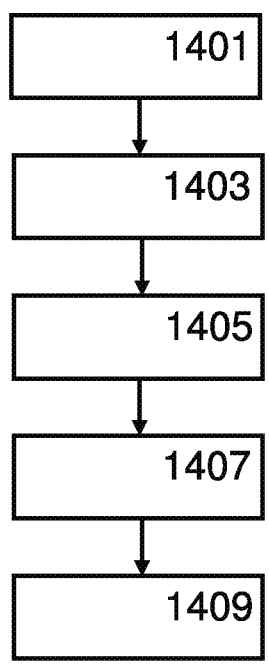
FIG. 14 shows a flow chart for a method according to an exemplary embodiment.

FIG. 14 shows a flow chart for a method according to an exemplary embodiment. The method is used, e.g., for operating a vehicle with an operating device such as that shown in FIG. 1.

The viscosity of the magnetorheological medium in the actuator unit for the vehicle's operating device is set in step 1401, e.g. by adjusting a magnetic field. A characterizing value is obtained in step 1403, which characterizes the movement of the outer unit on the operating device. The characterizing value is used in step 1405 to generate a control signal to control a vehicle function.

The absence of an operator's hand on the outer unit of the operating device is detected in a further detection step 1407, in order to obtain a hand signal indicating this absence. The hand signal is acted on in a manipulating step 1409, e.g. brought to a value that corresponds to or represents an unactuated state of the operating device.

When the further detection step 1407 and the manipulating step 1409 are executed, an automatic return is enabled in that the control signal assumes a value corresponding to an unactuated state of the operating device. If the hand of the user, e.g. a vehicle operator, is removed from the operating device, specifically the outer unit, this is detected immediately in the further detection step 1407 by the sensor unit, and the control signal is acted on in the manipulating step 1409 such that the operating device is returned to its original position by the reset unit (acceleration=0), or if the operating device has a symmetrical design in relation to the axis of rotation, acceleration is affected directly via the control signal.

If an exemplary embodiment comprises an "and/or" conjunction between a first feature and a second feature, this can be read to mean that the exemplary embodiment contains both the first and second feature in one embodiment, and either just the first or just the second feature in another embodiment.

REFERENCE SYMBOLS 100 vehicle
102 operating device
104 drive motor
106 brakes
210 handle or outer unit
212 actuator unit
213 actuator mount
214 actuator control unit
216 shaft
218 gearing or gearwheels
270 detection device
271 control signal
285 sensor unit
288 hand signal
290 reset unit
292 carrier
294 electronics unit
295 light source
415 first direction of rotation
520 retaining force curve
620 retaining force curve
720 retaining force curve
820 retaining force curve
915 second direction of rotation
1020 retaining force curve
1115 alternating directions
1230 first handle section
1232 second handle section
1234 first actuator
1236 second actuator
1240 first shaft
1242 second shaft
1350 adjusting device
1352 adjustment signal
1354 magnetorheological medium
1356 electromagnet
1358 magnetic field
1360 speed signal
1362 preset speed signal
1364 rotational rate signal
1366 preset rotational rate signal
1372 motor control signal
1374 rotational rate control signal
1376 speed control signal
1378 acceleration control signal
1380 shifting control signal
1382 braking control signal
1401 setting step
1403 detecting step
1405 generating step
1407 further detecting step
1409 manipulation step

The invention claimed is:
1. An operating device for a vehicle comprising:
an outer unit configured to be rotated manually by a user of the operating device;
a detection device configured to detect a movement of the outer unit and generate a control signal for a vehicle function based on a value corresponding to the movement;
an actuator unit comprising a magnetorheological medium and coupled to the outer unit, wherein the actuator unit is configured to exert a retaining force on the outer unit based on a viscosity of the magnetorheological medium;
a sensor unit located in the outer unit, which is configured to generate a hand signal indicating an absence of the user's hand on the outer unit of operating device; and
a manipulating device configured to manipulate the control signal based on the hand signal,
wherein the manipulating device comprises a reset unit configured to return the outer unit to a neutral position.

2. The operating device according to claim 1, wherein the reset unit is configured to mechanically and/or electrically return the outer unit to the neutral position.

3. The operating device according to claim 1, wherein the manipulating device and the detection device are the same device, and wherein the detection device is configured to generate the control signal representing the neutral position of the outer unit based on the hand signal.

4. The operating device according to claim 1, wherein the operating device comprises at least one light source for lighting the outer unit from the inside.

5. The operating device according to claim 1, wherein the actuator unit is configured to adjust the viscosity of the magnetorheological medium using an adjustment signal to set a strength of the retaining force.

6. The operating device according to claim 5, wherein the operating device comprises an adjusting device configured to generate the adjustment signal using at least one of:
a speed signal indicating a speed of the vehicle,
a preset speed signal indicating a preset speed of the vehicle,
a rotational rate signal indicating a rotational rate of the vehicle's motor, and/or
a preset rotational rate signal indicating a preset rotational rate of the vehicle's motor.

7. The operating device according to claim 1, wherein the outer unit is configured to move in at least one of a first direction of rotation or a second direction of rotation opposite the first direction of rotation, and the actuator unit is configured to exert the retaining force on the outer unit for dampening a rotational movement of the outer unit in the at least one of the first direction or the second direction.

8. The operating device according to claim 1, wherein the detection device is configured to detect at least one of a direction of the movement, a speed of the movement, and/or a temporal course of the movement as the value corresponding to the movement.

9. The operating device according to claim 1, wherein the detection device is configured to generate the control signal to control at least one of a power output of the vehicle's motor, a rotational rate of the vehicle's motor, a speed of the vehicle, an acceleration of the vehicle, the vehicle's transmission, and/or the vehicle's brakes.

10. The operating device according to claim 1, wherein the actuator unit is configured to support the outer unit such that the outer unit can move.

11. The operating device according to claim 1,
the outer unit comprises a handle that has a first moving handle section and a second moving handle section, and
wherein the actuator unit comprises:
a first actuator comprising a first magnetorheological medium; and
a second actuator containing a second magnetorheological medium, wherein the first actuator is coupled to the first handle section and is configured to exert a first retaining force on the first handle section based on a viscosity of the first magnetorheological medium, and wherein the second actuator is coupled to the second handle section and is configured to exert a second retaining force on the second handle section based on a viscosity of the second magnetorheological medium.

12. A vehicle comprising the operating device according to claim 1.

13. The operating device according to claim 1, wherein the reset unit is connected to the outer unit by means of a gearing.

14. An operating device for a vehicle comprising:
an outer unit, comprising a handle that has a first moving handle section and a second moving handle section, configured to be rotated manually by a user of the operating device;
a detection device configured to detect a movement of the outer unit and generate a control signal for a vehicle function based on a value corresponding to the movement;
an actuator unit comprising a magnetorheological medium and coupled to the outer unit, wherein the actuator unit is configured to exert a retaining force on the outer unit based on a viscosity of the magnetorheological medium,
wherein the actuator unit comprises:
a first actuator comprising a first magnetorheological medium; and
a second actuator containing a second magnetorheological medium,
wherein the first actuator is coupled to the first handle section and is configured to exert a first retaining force on the first handle section based on a viscosity of the first magnetorheological medium, and
wherein the second actuator is coupled to the second handle section and is configured to exert a second retaining force on the second handle section based on a viscosity of the second magnetorheological medium;
a sensor unit located in the outer unit, which is configured to generate a hand signal indicating an absence of the user's hand on the outer unit of operating device; and
a manipulating device configured to manipulate the control signal based on the hand signal.

15. The operating device according to claim 14, wherein the outer unit is configured to move in at least one of a first direction of rotation or a second direction of rotation opposite the first direction of rotation, and the actuator unit is configured to exert the retaining force on the outer unit for dampening a rotational movement of the outer unit in the at least one of the first direction or the second direction.

16. The operating device according to claim 14, wherein the actuator unit is configured to support the outer unit such that the outer unit can move.

17. A method for operating a vehicle comprising:
receiving a movement by an outer unit of an operating device of the vehicle;
setting a viscosity of a magnetorheological medium in an actuator unit of the operating device;
exerting, by the actuator unit, a retaining force on the outer unit of the operating device based on the viscosity of the magnetorheological medium;
detecting, by a detection device configured to detect the movement of the outer unit, a value that characterizes the movement of the outer unit;
generating, by the detection device, a control signal to control a function of the vehicle using the value that characterizes the movement of the outer unit;
detecting, by a sensor unit, an absence of a user's hand on the outer unit on the operating device to generate a hand signal indicating the absence;
manipulating, by a manipulating device, the control signal on the basis of the hand signal; and
returning, with a reset unit, the outer unit to a neutral position.

18. The method according to claim 17, further comprising:
lighting the outer unit from the inside with at least one light source.

19. The method according to claim 17, further comprising:
adjusting, by the actuator unit, the viscosity of the magnetorheological medium using an adjustment signal to set a strength of the retaining force.

20. The method according to claim 19, further comprising:
generating, by an adjusting device, the adjustment signal using at least one of:
a speed signal indicating a speed of the vehicle,
a preset speed signal indicating a preset speed of the vehicle,
a rotational rate signal indicating a rotational rate of the vehicle's motor, and/or
a preset rotational rate signal indicating a preset rotational rate of the vehicle's motor.

* * * * *